United States Patent [19]

Tamura et al.

[11] Patent Number: 4,923,626
[45] Date of Patent: May 8, 1990

[54] REFRIGERANTS

[75] Inventors: Kohji Tamura, Kawanishi; Hiroshi Kashiwagi, Settsu; Masahiro Noguchi, Osaka, all of Japan

[73] Assignee: Daikin Industries, Ltd., Osaka, Japan

[21] Appl. No.: 263,890

[22] Filed: Oct. 28, 1988

[30] Foreign Application Priority Data

Nov. 2, 1987 [JP] Japan ................. 62-277873

[51] Int. Cl.$^5$ .............................. C09K 5/04
[52] U.S. Cl. ......................... 252/67; 62/114
[58] Field of Search ............... 252/67; 62/114

[56] References Cited

FOREIGN PATENT DOCUMENTS 63-105088  5/1988  Japan ........................ 252/67
63-105089  5/1988  Japan ........................ 252/67

Primary Examiner—Paul Lieberman
Assistant Examiner—Christine A. Skane
Attorney, Agent, or Firm—Larson & Taylor

[57] ABSTRACT

A refrigerant comprising chloro-difluoromethane and 1,1,1-trifluoroethane.

2 Claims, 4 Drawing Sheets

REFRIGERANTS

This invention relates to a working fluid especially usuful for a refrigerator, air conditioner, etc (hereinafter simply referred to as a refrigerant unless otherwise required).

Refrigerants heretofore used in refrigerator, air conditioner and the like usually comprise chlorodifluoromethane (hereinafter referred to as "R-22"). However, R-22 is not fully satisfactory as refrigerant since it is low in refrigerating performance such as heating capacity, energy efficiency ratio, cooling capacity, ect.

We conducted extensive research to develop novel working fluids which have improved properties and found that when R-22 is mixed with 1,1,1-trifluoroethane (hereinafter referred to as "R-143a"), a refrigerant can be obtained which exhibits desired high performance.

The present invention provides a refrigerant comprising chlorodifluoromethane and 1,1,1-trifluoroethane.

The present invention will be described below in more detail with reference to, when required, the accompanying drawings.

Figure 1:
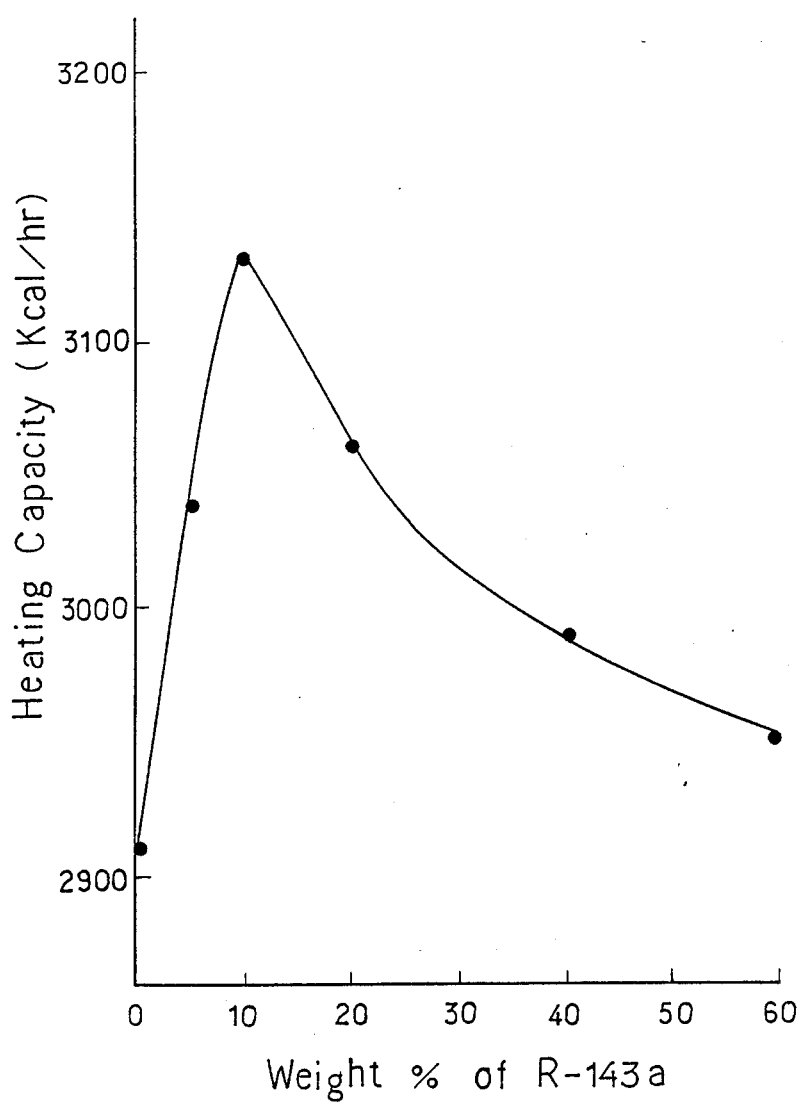
FIG. 1 is a graph showing a relationship between the proportions in the refrigerant of R-22 and R-143a and the heating capacity.

A refrigerant composition according to the invention usually comprises about 40 to about 95% by weight of R-22 and about 60 to about 5% by weight of R-143a. The refrigerants containing R-22 outside said range of ratio cannot achieve an improved heating capacity in comparison with R-22 alone. Of refrigerants composed of R-22 and R-143a, a preferred one comprises about 80 to about 95% by weight of the former and about 20 to about 5% by weight of the latter. The refrigerants having these preferred compositions can display a highly improved heating capacity.

The refrigerants of the invention can advantageously be made nonflammable with R-22:R-143a ratio of 34 to 95% by weight:66 to 5% by weight.

The composition of the invention is useful not only as the refrigerants for heating and cooling air conditioners but also as the refrigerants for refrigerators.

The refrigerants according to the invention exhibit high heating capacity and energy efficiency ratio when a heating and cooling air conditioner is operated in heating cycle. The refrigerants are excellent also in thermalstability and safety. The refrigerants have a high coefficient of performance which is defined as the ratio of refrigerating capacity/work of compression and therefore usueful also as the coolants for refrigerators.

The features of the invention will be clarified below with reference to the following Examples and Comparison Example.

EXAMPLES 1 TO 5 AND COMPARISON EXAMPLE 1

Refrigerants were prepared by mixing together R-22 and R-143a in the various proportions shown below in Table 1 (weight ratio).

TABLE 1

|  | R-22 | R-143a |
| --- | --- | --- |
| Comp. Ex. 1 | 100 | 0 |
| Ex. 1 | 95 | 5 |
| Ex. 2 | 90 | 10 |
| Ex. 3 | 80 | 20 |
| Ex. 4 | 60 | 40 |
| Ex. 5 | 40 | 60 |

Various properties given below were measured in a heating cycle and a cooling cycle each conducted under the following conditions.

| I. Heating cycle: | |
| --- | --- |
| Temperature within the room | 21.0° C. |
| Temperature outside the room | |
| Dry bulb | 7.0° C. |
| Wet bulb | 5.0° C. |
| Electrical source | 50 Hz |
| Operating frequency | 110 Hz |
| Air delivery | 8.0 m³/min. |
| Super heat | 5° C. |
| II. Cooling cycle: | |
| Temperature within the room | |
| Dry bulb | 27.0° C. |
| Wet bulb | 19.5° C. |
| Temperature outside the room | 35.0° C. |
| Electrical source | 50 Hz |
| Operating frequency | 100 Hz |
| Air delivery | 6.4 m³/min. |
| Super heat | 8° C. |

Results obtained are as follows.

A. Heating cycle

Table 2 shows (I) suction pressure [kg/cm².G], (II) suction temperature [°C.], (III) discharge pressure [kg/cm².G], (IV) discharge temperature [°C.], (V) heating capacity [kcal/hr] and (VI) energy efficiency ratio [kcal/hr/W].

TABLE 2

|  | (I) | (II) | (III) | (IV) | (V) | (VI) |
| --- | --- | --- | --- | --- | --- | --- |
| Comp. Ex. 1 | 3.74 | 3.4 | 18.91 | 103.5 | 2910 | 2.14 |
| Ex. 1 | 3.76 | 4.7 | 19.34 | 103.2 | 3040 | 2.21 |
| 2 | 3.79 | 6.2 | 19.65 | 103.0 | 3130 | 2.26 |
| 3 | 3.90 | 5.8 | 20.63 | 101.0 | 3060 | 2.20 |
| 4 | 4.09 | 5.5 | 21.40 | 99.1 | 2990 | 2.16 |
| 5 | 4.29 | 5.4 | 21.74 | 96.8 | 2950 | 2.09 |

Figure 2:
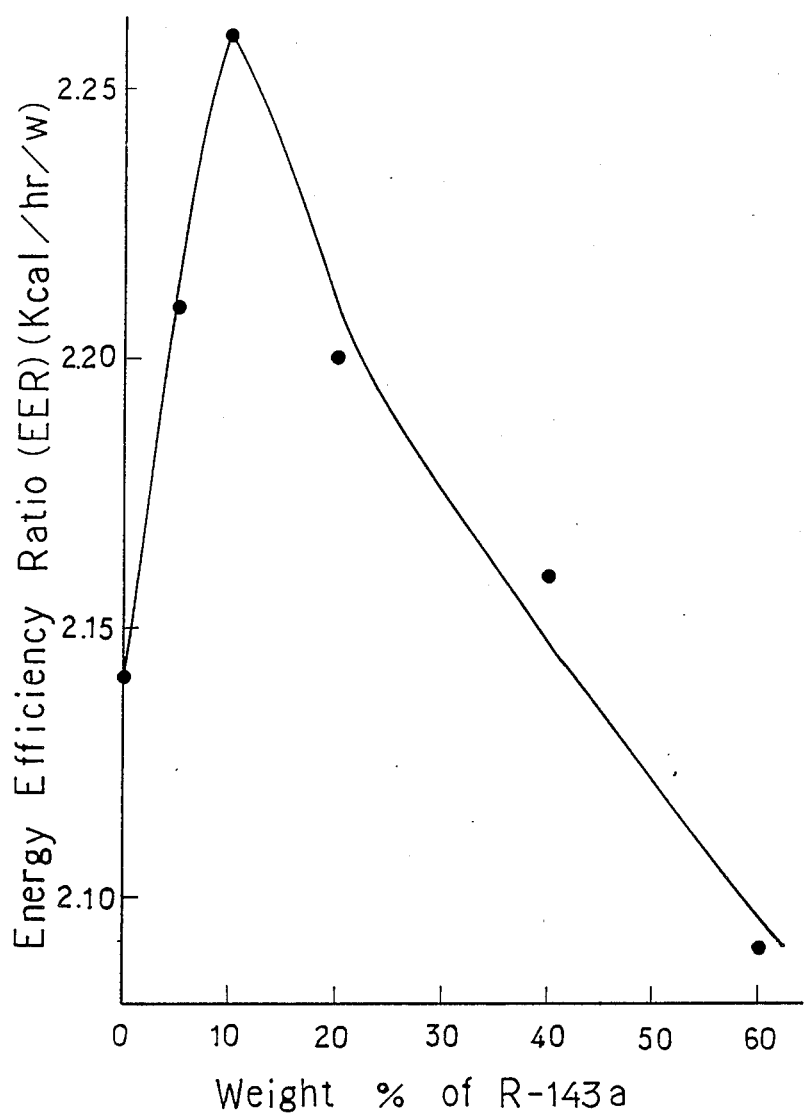
FIG. 2 is a graph showing a relationship between the proportions of R-22 and R-143a and the energy efficiency ratio (EER) in the heating cycle.

FIG. 1 indicates a graph illustrating the relationship between the proportions of R-143a in the refrigerant and the heating capacity and FIG. 2 shows the relationship between the proportions thereof and the energy efficiency ratio in the heating cycle.

Table 2, FIG. 1 and FIG. 2 reveal that the refrigerants of the present invention have outstanding properties as working fluid for heating apparatus.

B. Cooling cycle

Table 3 shows (I) suction pressure [kg/cm².G], (II) suction temperature [°C.], (III) discharge pressure [kg/cm².G], (IV) discharge temperature [°C.], (V) cooling capacity [kcal/hr] and (VI) energy efficiency ratio [kcal/hr/W].

TABLE 3

|  | (I) | (II) | (III) | (IV) | (V) | (VI) |
|---|---|---|---|---|---|---|
| Comp. Ex. 1 | 4.77 | 12.7 | 17.85 | 96.4 | 2270 | 1.92 |
| Ex. 1 | 4.80 | 14.2 | 18.00 | 96.1 | 2275 | 1.93 |
| 2 | 4.83 | 14.6 | 18.18 | 95.5 | 2280 | 1.93 |
| 3 | 4.91 | 13.3 | 18.54 | 94.5 | 2290 | 1.92 |
| 4 | 5.02 | 12.8 | 19.11 | 92.9 | 2285 | 1.89 |
| 5 | 5.17 | 12.1 | 19.74 | 91.7 | 2280 | 1.86 |

Figure 3:
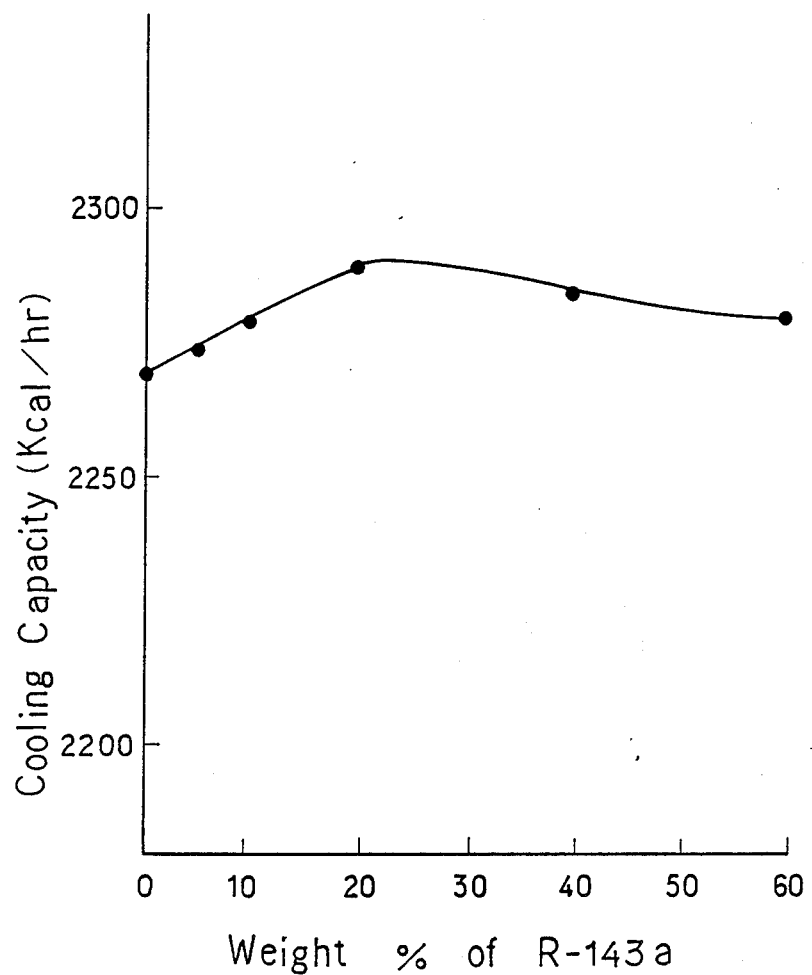
FIG. 3 is a graph showing a relationship between the proportions of R-22 and R-143a and the cooling capacity.
Figure 4:
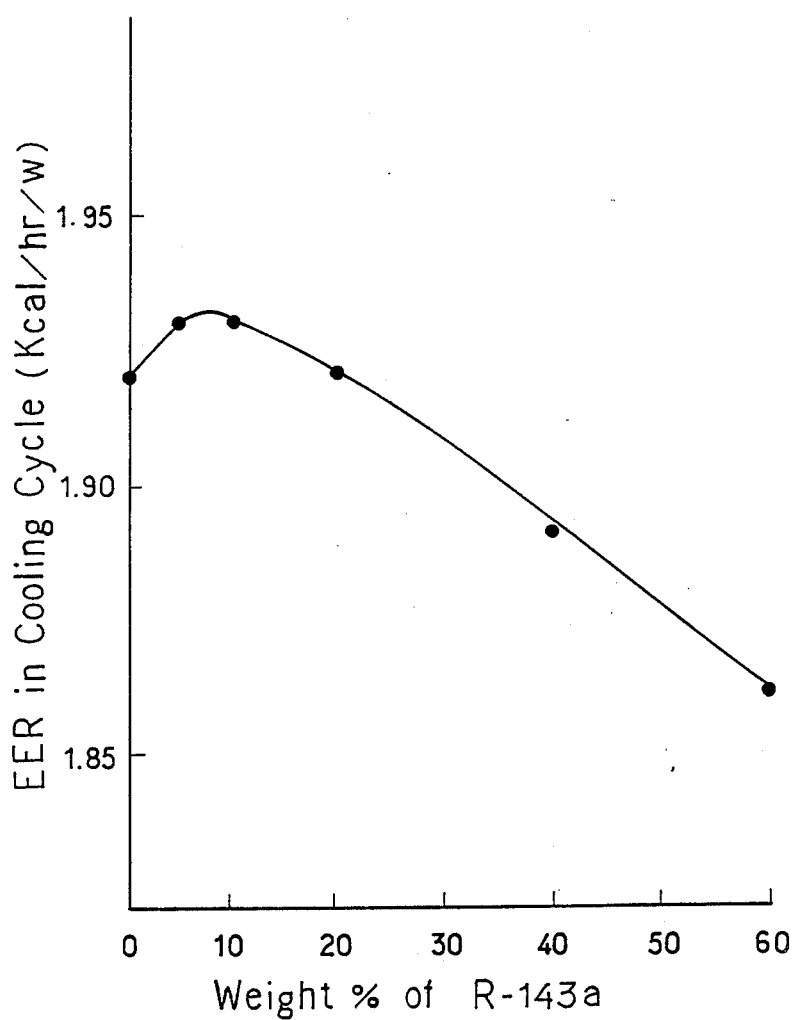
FIG. 4 is a graph showing a relationship between the proportions of R-22 and R-143a and the energy efficiency ratio in the cooling cycle.

FIG. 3 indicates a graph illustrating the relationship between the proportions of R-143a and the cooling capacity and FIG. 4 indicates the relationship between the proportions thereof and the energy efficiency ratio in the cooling cycle.

Table 3, FIG. 3 and FIG. 4 reveal that the refrigerants of the present invention have outstanding properties as working fluid for cooling and refrigerating apparatuses.

EXAMPLE 6

An steel piece (SS41, 2 mm×5 mm×50 mm) was placed in a 1:1 mixture of lubricant oil and a composition of the invention and heated at 180° C. for 50 days. The mixture was checked for the concentration of halogen by gas chromatography.

The results are given in Table 4 below.

TABLE 4

| Composition | Concentration of halogen (ppm) |
|---|---|
| Comp. Ex. 1 | 30 |
| Ex. 1 | 25 |
| 2 | 24 |
| 3 | 20 |
| 4 | 12 |
| 5 | 9 |

The results shown in Table 4 reveal that the compositions of the invention comprising a mixture of R-22 and R-143a are thermally more stable in comparison with a refrigerant comprising R-22 alone.

We claim:

1. A refrigerant comprising about 40 to about 95% by weight of chlorodifluoromethane and about 60 to about 5% by weight 1,1,1-trifluoroethane.

2. A refrigerant according to claim 1 which comprises about 80 to about 95% by weight of chlorodifluoromethane and about 20 to about 5% by weight 1,1,1-trifluoroethane.

* * * * *